F. J. SNYDER.
ANCHOR BOLT.
APPLICATION FILED JAN. 18, 1912.
1,037,678.
Patented Sept. 3, 1912.
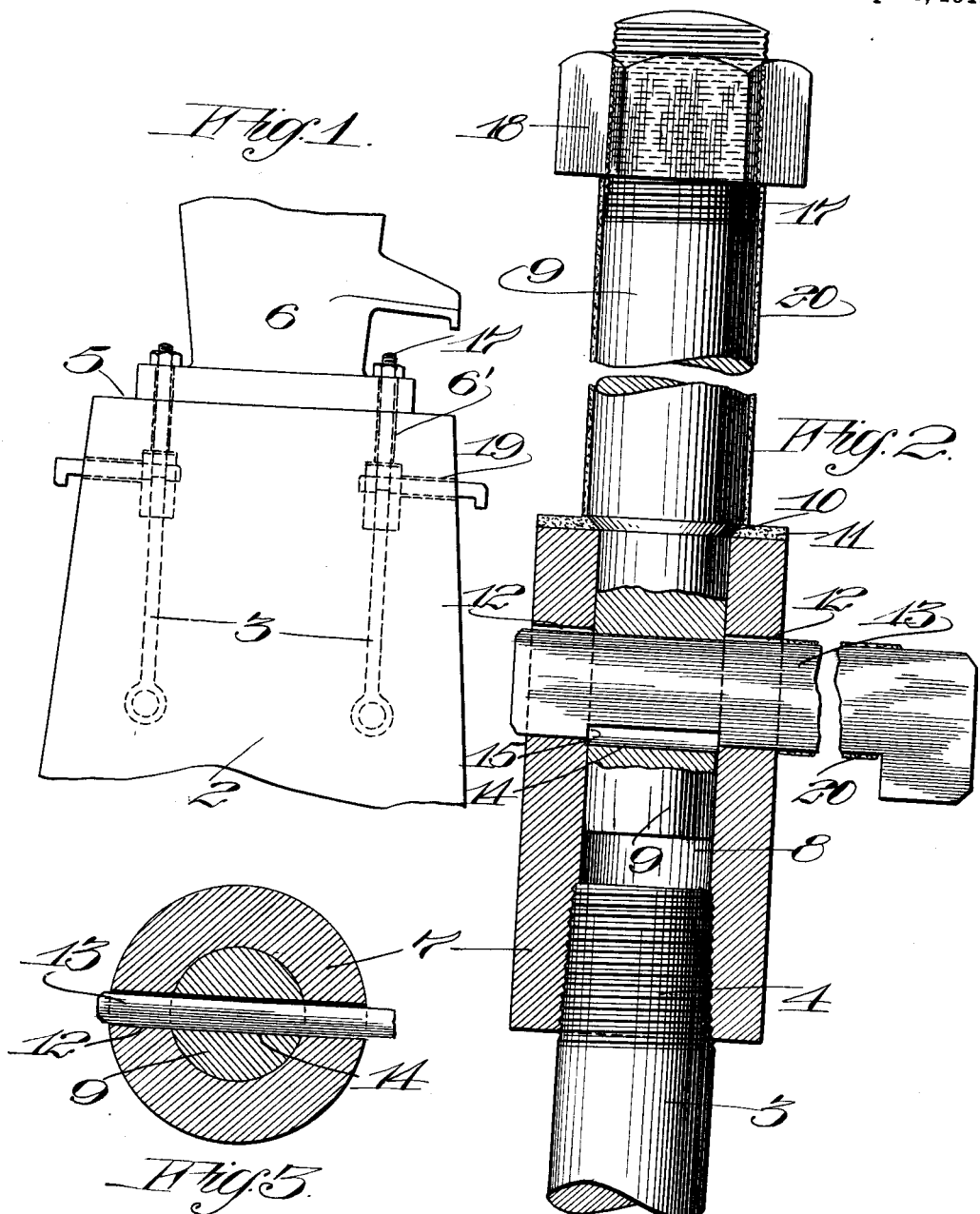

UNITED STATES PATENT OFFICE.

FRED J. SNYDER, OF TUCSON, ARIZONA.

ANCHOR-BOLT.

1,037,678.

Specification of Letters Patent. Patented Sept. 3, 1912.

Application filed January 18, 1912. Serial No. 671,830.

*To all whom it may concern:*

Be it known that I, FRED J. SNYDER, a citizen of the United States, residing at Tucson, in the county of Pima and State of Arizona, have invented new and useful Improvements in Anchor-Bolts, of which the following is a specification.

This invention relates to anchor bolts, and more particularly to sectional anchor bolts for use in conjunction with heavy machinery resting upon masonry.

The object of the present invention is to provide a bolt whereby massive machinery may be rigidly connected to a masonry or concrete foundation, and particularly to provide an anchor bolt of such design and construction that the possibility of the bolt or bolts breaking is greatly reduced, and further to provide an improved anchor-bolt having in view the object of avoiding a great loss of time and expensive repair work involved when an ordinary continuous anchor bolt or bolts are broken.

Many years of experience in mine mills have led me to observe the necessity and value of a form of anchor bolt which will eliminate to the largest extent possible the liability of fracture of the bolt, and thus to avoid the loss of time and expense incurred by the breaking of the bolts. Ordinary mill mortars are provided with flanges which are adapted to be anchored to concrete foundations through the bolts being embedded firmly in the concrete foundation and projecting upwardly so as to extend through the flange of the mortar and receive locking nuts. The tremendous strain of constant vibration of the mortar, causing the bolts to fracture or break adjacent their upper portions, and the repair of such damage is not only expensive but involves a great loss of time.

The present anchor bolt forming the subject matter of this specification is made in detachable parts so that in case the uppermost part of the bolt becomes damaged it can be readily removed without any considerable loss of time and expenditure of labor in repairs.

The invention consists of the parts and the construction and combination of parts as hereinafter more fully described and claimed, having reference to the accompanying drawings, in which—
Figure 1 is a view of a part of the mortar and foundation showing the bolts applied. Fig. 2 is an enlarged sectional detail of the bolt. Fig. 3 is a cross section of the same in the line of the key.

In practising my invention, during the construction of foundation 2, which may be of concrete or other suitable material, I embed in the latter a plurality of substantial bolt shanks 3 of suitable thickness and length, the upper ends of the shanks being threaded as at 4, and terminating a suitable distance below the top plane 5 of the foundation upon which rests a mortar indicated at 6. Threaded securely upon the upper end of each bolt shank 4 is a sleeve or socket member 7 having a cylindrical chamber 8 of appropriate diameter into which may be axially inserted a detachable bolt section 9 having a shoulder portion 10, which may seat upon a packing material 11, resting upon the upper end of the socket 7. The socket 7 is of such length as to securely embrace the upper end of the permanently embedded shank 3 and the upper end of the socket 7 is designed to terminate a suitable depth below the top plane 5 of the foundation 2.

The socket member 7 is diametrically slotted as at 12 to receive a suitable key 13, which may be passed through the slot 12 of the socket 7, and through a slot or chamber 14 in the lower reduced portion of the bolt section 9; the lower side or edge of the key 13 is slightly undercut or recessed, as at 15, so that when the detachable bolt section 9 is drawn upwardly the surface 16 of the chamber 14 will interlock with the recess 15 of the key, thereby forming a secure attachment between the stem 9 and the socket 7. The upper end of the detachable stem 9 is threaded as at 17, so that when the key 13 is removed, the mortar 6 may be assembled in place on the top plane 5 of the foundation, and the detachable stem section 9 lowered through the perforations 6' in the mortar until they enter the open sockets 7 embedded in the foundation structure. The upper threaded portion 17 of the detachable stems 9 project sufficiently above the mortar flange 6 to receive lock nuts 18, and as these are screwed firmly home they draw the bolt section 9 upwardly to embrace the key 13 when this has been inserted through the perforations in the socket member and chamber 14 of the stem 9.

As shown in Fig. 1, the keys 13 are of sufficient length to project through chambers 19 formed for their reception in the foundation structure, the heads of the keys 13 being adapted for engagement with a suitable tool or device whereby they may be withdrawn when occasion requires, to permit the removal of the detachable stem 9. For the purpose of protecting the removable parts of the anchor bolt, such as the key 13 and the bolt section 9 from becoming set in the foundation structure, it is preferable to wrap the key 13 and the bolt section 9 with some suitable insulating material, such as paper, fiber, asbestos, etc., indicated at 20. The packing member 11 resting upon the upper end of the socket 7 is also provided to prevent the setting of the stem 9 relative to the upper end of the socket 7, and also to form a seat for the shoulder 10 of the stem 9. It will thus be seen that by the present sectional bolt structure, should it occur that the upper portion 9 of the bolt becomes injured or broken, it may be readily removed by withdrawing the locking key 13 from the socket 7, thus releasing the section 9, when the latter can be withdrawn through the flange of the mortar 6, and another perfect bolt section 9 inserted and locked, the whole operation consuming but very little time, and not necessitating the destruction or repair of the masonry or concrete structure 2 whatsoever.

The packing material which is used to surround the removable key and the bolt section 9 may be indurated with a mixture of grease or heavy oil with plumbago which will prevent the concrete from entering the crevices around the removable piece, and the plumbago forms a lubricant to permit the easy withdrawal or insertion of new parts as may be required.

Having thus described my invention, what I claim and desire to secure by Letters Patent, is—

1. An anchor-bolt comprising alined sections one of which is adapted to be permanently mounted in a foundation structure and is provided with a threaded portion at its upper end; an internally threaded socket member attachable to said embedded section, said socket member having a diametrical slot and a central chamber intercommunicating, the uppermost of the bolt sections having its lower end adapted to be inserted into the socket, and having a diametric chamber capable of registering with the slot in the socket and a key adapted to project into the alined slots and uppermost of the bolt-sections, said key having an undercut or recess at its lower edge, into which a contiguous wall of the chamber in the uppermost bolt-section may be drawn.

2. The combination of a masonry or concrete foundation having a bolt-hole and a key-chamber formed therein, a bolt section permanently embedded in said foundation, a socket formed upon the upper end of said bolt-section, said socket having a diametric slot in line with the key-chamber formed in the foundation, a detachable bolt section alined with the first-named section and insertible into the bolt-hole in said foundation, and into the socket, and having a diametric chamber alinable with the slot in the socket, and a key insertible through the key-chamber in the foundation and adapted to lock the socket and the second-named bolt section.

In testimony whereof I have hereunto set my hand in the presence of two subscribing witnesses.

FRED. J. SNYDER.

Witnesses:
PHILIP CONTZEN,
CHARLES M. LEITH.

Copies of this patent may be obtained for five cents each, by addressing the "Commissioner of Patents, Washington, D. C."